United States Patent [19]
Takahashi et al.

[11] Patent Number: 5,482,978
[45] Date of Patent: Jan. 9, 1996

[54] EXPANDABLE CONDUCTIVE SILICONE RUBBER COMPOSITION AND CONDUCTIVE SPONGE ROLL

[75] Inventors: Masaharu Takahashi; Tomiyoshi Tsuchida, both of Usui, Japan

[73] Assignee: Shin-Etsu Chemical Co., Ltd., Tokyo, Japan

[21] Appl. No.: 429,876

[22] Filed: Apr. 27, 1995

[30] Foreign Application Priority Data

Apr. 27, 1994 [JP] Japan .................................. 6-112245

[51] Int. Cl.⁶ .................... C07C 303/00; C07C 307/00; C08J 9/02
[52] U.S. Cl. .................... 521/82; 252/511; 521/96; 521/99; 521/154
[58] Field of Search ........................ 521/82, 96, 99, 521/154; 252/511

[56] References Cited

U.S. PATENT DOCUMENTS

| | | | |
|---|---|---|---|
| 4,136,238 | 1/1979 | Hilterhaus | 521/154 |
| 4,230,820 | 10/1980 | Maschberger et al. | 521/154 |
| 4,559,369 | 12/1985 | Bauman et al. | 521/154 |
| 4,572,917 | 2/1986 | Graiuer et al. | 521/154 |
| 4,584,324 | 4/1986 | Bauman et al. | 521/154 |
| 4,965,296 | 10/1990 | Hastings | 521/154 |
| 5,019,295 | 5/1991 | Yoshida et al. | 521/154 |
| 5,135,960 | 8/1992 | Higuchi et al. | 521/154 |

*Primary Examiner*—Morton Foelak
*Attorney, Agent, or Firm*—Millen, White, Zelano, & Branigan

[57] ABSTRACT

An expandable conductive-silicone rubber composition includes (A) an organopolysiloxane having at least two alkenyl groups, (B) conductive carbon black, (C) an organic peroxide of the formula:

$$R^2-OO-\underset{\underset{O}{\|}}{C}-O-X-O-\underset{\underset{O}{\|}}{C}-OO-R^3 \qquad (2)$$

wherein $R^2$ and $R^3$ each are a monovalent $C_3$–$C_{10}$ hydrocarbon group or a group of $-SiR^4_3$ wherein $R^4$ is methyl, ethyl or phenyl, X is $-(CH_2)_n-$, $-CH_2-C(CH_3)_2-CH_2-$ or $-(C_2H_4O)_m-C_2H_4-$ wherein n=2 to 8 and m=1 to 4, (D) an organohydrogenpolysiloxane, (E) a platinum catalyst, and (F) a blowing agent. It is fully stable during shelf storage, has a long pot life, and is rapidly expandable and curable through hot air vulcanization into conductive silicone rubber foam having high conductivity and improved fatigue endurance of sponge cells when the foam is used as a sponge roll.

11 Claims, No Drawings

EXPANDABLE CONDUCTIVE SILICONE RUBBER COMPOSITION AND CONDUCTIVE SPONGE ROLL

TECHNICAL FIELD

This invention relates to an expandable conductive silicone rubber composition containing conductive carbon black and a conductive silicone rubber foam obtained by curing the same. More particularly, it relates to an expandable conductive silicone rubber composition having a long pot life and converting through hot air vulcanization into a conductive silicone rubber foam having improved physical properties, robust sponge cells, and fatigue endurance. A conductive sponge roll obtained from the conductive silicone rubber foam is suitable for use as fixing rolls, charging rolls, developing rolls, transfer rolls, toner carrying rolls, and cleaning rolls for copying machines and facsimile machines.

BACKGROUND

Most rubbery materials are electric insulators. A number of conductive rubbers are available as mixtures of rubbery material and conductive agents. For example, rubbers having carbon black blended therein to provide an electric resistivity of from $10^5$ to 10 $\Omega\cdot$cm are conductive rubbers which are used in various applications.

Silicone rubber is also widely used as electrically insulating rubber because of its high-temperature resistance, low-temperature resistance and weatherability. It can also be used as conductive silicone rubber by adding conductive agents like other rubbery materials. It is also known to add blowing agents thereto whereupon the composition is expanded and cured into conductive silicone rubber foams.

However, only a limited vulcanization system is applicable to conductive silicone rubber compositions having blended therein acetylene black and other carbon black as a conductive agent when they are continuously molded as by extrusion molding and vulcanized into a length of article such as a seal, gasket and roll. More particularly, typical organic peroxide vulcanization fails to yield satisfactory molded products. If acyl series peroxides commonly used in atmospheric hot air vulcanization (HAV) of conventional silicone rubber compositions, for example, benzoyl peroxide and 2,4-dichlorobenzoyl peroxide are used in carbon black-containing systems, the carbon black acts to restrain vulcanization. If alkyl series peroxides, for example, dicumyl peroxide and di-tert-butyl peroxide are used in carbon black-containing systems, compression molding is permissible, but extrusion atmospheric hot air vulcanization fails to yield satisfactory products because the surface is vulcanized short due to the influence of oxygen in air.

For extrusion atmospheric hot air vulcanization of carbon black-containing silicone rubber compositions, an addition vulcanization approach was conventionally used in order to overcome the above-mentioned difficulty. This approach is to add a platinum series addition reaction catalyst to a mixture of an organopolysiloxane having an alkenyl group and an organohydrogenpolysiloxane having a silicon-attached hydrogen atom capable of addition reaction with the alkenyl group, thus inducing addition reaction curing.

This addition reaction curing approach, however, suffers from the problems of a limited shelf life, a short pot life, and poisoning by catalyst poisons such as amines, sulfur and tin. When it is desired to obtain a satisfactory expanded product or foam, vulcanization must be carried out to a certain extent (until scorching) through addition vulcanization in order to confine within the system a blowing gas resulting from decomposition of a blowing agent. It is then necessary to look for an optimum control agent for controlling addition reaction. Even if an appropriate control agent is used, the permissible pot life to produce a satisfactory foam is limited to a very narrow time duration. It is then substantially impossible for an addition reaction system to continuously produce a conductive silicone rubber foam through atmospheric hot air vulcanization. There is a desire to have an expandable conductive silicone rubber composition which has a long pot life which is acceptable by the worker engaged in sponge molding and is rapidly vulcanizable into a silicone rubber foam having improved physical properties.

SUMMARY OF THE INVENTION

Therefore, an object of the present invention is to provide an expandable conductive silicone rubber composition loaded with conductive carbon black which is fully stable during shelf storage and is moldable and rapidly vulcanizable through hot air vulcanization into a silicone rubber foam having high conductivity and improved physical properties, especially improved fatigue endurance of sponge cells when the foam is used as a sponge roll. Another object of the present invention is to provide a sponge roll in the form of a conductive silicone rubber foam obtained by expanding and curing the same composition.

According to the present invention, there is provided an expandable conductive silicone rubber composition comprising (A) an organopolysiloxane of the following general formula (1):

$$R^1{}_a SiO_{(4-a)/2} \tag{1}$$

wherein $R^1$, which may be identical or different, is a substituted or unsubstituted monovalent hydrocarbon group, at least two alkenyl groups being contained per molecule, and letter a is a positive number of 1.90 to 2.05, (B) conductive carbon black, (C) an organic peroxide of the following general formula (2):

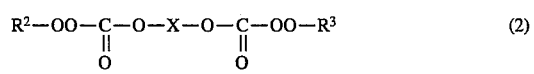
$$R^2-OO-\underset{\underset{O}{\|}}{C}-O-X-O-\underset{\underset{O}{\|}}{C}-OO-R^3 \tag{2}$$

wherein each of $R^2$ and $R^3$ which may be identical or different, is a monovalent hydrocarbon group having 3 to 10 carbon atoms or a group of the following formula (3):

$$-SiR^4{}_3 \tag{3}$$

wherein $R^4$ is a methyl, ethyl or phenyl group,

X is a group of the following formula (4), (5) or (6):

$$-(CH_2)_n- \tag{4}$$

$$-CH_2-\underset{\underset{CH_3}{|}}{\overset{\overset{CH_3}{|}}{C}}-CH_2- \tag{5}$$

$$-(C_2H_4O)_m-C_2H_4- \tag{6}$$

wherein n is an integer of 2 to 8 and m is an integer of 1 to 4, (D) an organohydrogenpolysiloxane,
(E) a platinum catalyst, and
(F) a blowing agent.

This expandable conductive silicone rubber composition is shelf stable for 7 days or more and easy to use because of high stability and a long pot life. Despite the inclusion of conductive carbon black, since the organic peroxide of formula (2) is unaffected thereby, the composition is susceptible to atmospheric hot air vulcanization (HAV) and ultra-high frequency (UHF) vulcanization combined with extrusion molding or calender molding so that the composition will quickly vulcanize or cure and expand into a conductive silicone rubber foam free of surface tack and having rigid sponge cell walls. When the foam is shaped as sponge roll, it has improved fatigue endurance and high conductivity.

In U.S. Pat. No. 4,771,099 and JP-A 124977/1990, we previously proposed a silicone rubber composition having an organic peroxide of formula (2) blended therein for enabling atmospheric hot air vulcanization (HAV). Finding that this organic peroxide specifically enables atmospheric hot air vulcanization of a carbon black loaded system, is very stable at about room temperature, and induces quick vulcanization upon heating, we also proposed in USP 5,294,373 an expandable conductive silicone rubber composition comprising components (A), (B), (C), and (F) which is atmospheric hot air vulcanizable. This composition, however, is less satisfactory in fatigue endurance in the application where fatigue endurance is required, especially as the roll material for copying and facsimile machines. Quite unexpectedly, we have found that by further adding components (D) and (E), that is, organohydrogenpolysiloxane and platinum catalyst to the composition, addition reaction takes place as a subordinate reaction whereby sponge cell walls of a sponge roll into which the foam is shaped are improved in dynamic fatigue endurance.

BEST MODE FOR CARRYING OUT THE INVENTION

Component (A) of the expandable conductive silicone rubber composition according to the present invention is an organopolysiloxane of the general formula (1).

$$R^1_a SiO_{(4-a)/2} \qquad (1)$$

In formula (1), $R^1$ which may be identical or different is selected from substituted or unsubstituted monovalent hydrocarbon groups preferably having 1 to 12 carbon atoms and letter a is a positive number of 1.90 to 2.05. Examples of the monovalent hydrocarbon group include alkyl groups such as methyl, ethyl, propyl and butyl groups; alkenyl groups such as vinyl, allyl and butenyl groups; aryl groups such as phenyl and tolyl groups; and substituted ones of these groups wherein some or all of the hydrogen atoms attached to carbon atoms are replaced by halogen atoms, cyano groups or the like, such as chloromethyl, chloropropyl, 3,3,3-trifluoropropyl and 2-cyanoethyl groups. In a molecule of the organopolysiloxane there is contained at least two alkenyl groups as $R^1$. The amount of alkenyl group is preferably 0.01 to 10 mol%, more preferably 0.05 to 5 mol %. Preferred among the groups of $R^1$ are methyl, vinyl, phenyl and 3,3,3,-trifluoropropyl.

The organopolysiloxanes of formula (1) should preferably have a linear molecular structure although a partially branched structure is acceptable. The organopolysiloxanes are often blocked with a triorganosilyl or hydroxyl group at the end of their molecular chain. Examples of the triorganosilyl group include trimethylsilyl, dimethylvinylsilyl, methylphenylvinylsilyl, methyldiphenylsilyl, methyl-divinylsilyl, and trivinylsilyl groups. For further reducing surface tack, organopolysiloxanes blocked with a polyfunctional group such as $(CH_2=CH)_2RSi-$ and $(CH_2=CH)_3Si-$ wherein R has the same meaning as $R^1$ at either end of their molecular chain are preferred. The organopolysiloxanes should preferably have a viscosity of at least 300 centistokes (cs) at 25° C. more preferably $10^6$ to $10^7$ cs at 25° C. (which correspond to an average degree of polymerization of 3,000 to 10,000) although the degree of polymerization is not critical.

Component (B) is electroconductive carbon black which may be selected from various types of conductive carbon black commonly used in conductive rubber compositions. Examples include acetylene black, conducting furnace black (CF), super conducting furnace black (SCF), extra conducting furnace black (XCF), conducting channel black (CC), and furnace black and channel black heat treated at elevated temperatures of about 1500° C. More particularly, the acetylene black includes Denka Acetylene Black manufactured by Denki Kagaku K.K., Shawinigan Acetylene Black manufactured by Shawinigan Chemical Co., the conducting furnace black includes Continex CF manufactured by Continental Carbon Co. and Vulcan C manufactured by Cabot Corp., the super conducting furnace black includes Continex SCF manufactured by Continental Carbon Co. and Vulcan SC manufactured by Cabot Corp., the extra conducting furnace black includes Asahi HS-500 manufactured by Asahi Carbon K.K. and Vulcan XC-72 manufactured by Cabot Corp., and the conducting channel black includes Corax L manufactured by Degussa Co. Also useful are modified furnace blacks commercially available as Ketjen Black EC and Ketjen Black EC-600JD from Ketjen Black International. Preferred among others is acetylene black because it is more conductive due to a reduced impurity content and a well developed secondary structure. Also, Ketjen Black EC and Ketjen Black EC-600JD are useful because they have an extremely increased specific surface area so that sufficient conductivity is accomplished with a low loading.

The conductive carbon black may be used alone or in admixture of two or more types, preferably in an amount of from about 5 to about 100 parts, more preferably from about 10 to about 70 parts by weight per 100 parts by weight of organopolysiloxane (A). Less than 5 parts of carbon black would sometimes fail to provide desired electric conduction whereas more than 100 parts of carbon black would sometimes result in cured products having low mechanical strength.

Component (C) is an organic peroxide of the general formula (2).

$$R^2-OO-\underset{\underset{O}{\|}}{C}-O-X-O-\underset{\underset{O}{\|}}{C}-OO-R^3 \qquad (2)$$

Each of $R^2$ and $R^3$ which may be identical or different is a monovalent hydrocarbon group having 3 to 10 carbon atoms such as, for example, n-propyl, isopropyl, t-butyl, n-butyl, n-amyl, t-amyl, hexyl, heptyl, octyl, 2-ethylpropyl, 2-ethylbutyl, 2-ethyl, and cumyl groups. Alternatively each of $R^2$ and $R^3$ is a trimethylsilyl, triethylsilyl or triphenylsilyl group of the formula:

$$-SiR^4_3 \qquad (3)$$

wherein $R^4$ is a methyl, ethyl or phenyl group.

X is a group of the following formula (4), (5) or (6):

$$-(CH_2)_n- \quad (4)$$

$$\begin{array}{c} CH_3 \\ | \\ -CH_2-C-CH_2- \\ | \\ CH_3 \end{array} \quad (5)$$

$$-(C_2H_4O)_m-C_2H_4- \quad (6)$$

wherein n is an integer of 2 to 8 and m is an integer of 1 to 4.

The organic peroxide (C) is effective as a vulcanizing agent for organopolysiloxane (A) and preferably blended in an amount of about 0.1 to about 5 parts, more preferably about 0.5 to about 3 parts by weight per 100 parts by weight of organopoly-siloxane (A). Often less than 0.1 part of the organic peroxide would be less effective for vulcanization, resulting in cured products which are practically unacceptable because of poor properties. More than 5 parts of the organic peroxide would sometimes have an adversely affect due to excess decomposition residue and be less cost effective.

According to the present invention, organo-hydrogenpolysiloxane (D) serves to improve vulcanizing capability and when combined with platinum catalyst (E), undergoes addition reaction as a subordinate reaction and thus contributes to the strength of sponge cell walls of a sponge roll, resulting in significantly improved fatigue endurance.

The organohydrogenpolysiloxane used herein is an organopolysiloxane having at least two hydrogen atoms each attached to a silicon atom. Preferably, the organohydrogenpolysiloxane has the following average compositional formula:

$$R_nH_mSiO_{(4-m-n)/2}$$

wherein R represents a substituted or unsubstituted monovalent hydrocarbon group having 1 to 12 carbon atoms, and letters n and m are numbers satisfying $0 \geq n<4$, $0<m<3$ and $0<m+n<4$. Examples of R are the same as $R^1$ explained above, although R is preferably a methyl group. Its molecular structure may be linear, branched or cyclic. Exemplary organohydro-genpolysiloxanes include a diorganopolysiloxane end-blocked with a dimethyl- hydrogensilyl group, a copolymer of a dimethylsiloxane unit, a methyl-hydrogensiloxane unit and a terminal trimethyl-siloxane unit, a low viscosity fluid consisting of a dimethylhydrogensiloxane unit and a $SiO_2$ unit, 1,3,5,7-tetrahydrogen-1,3,5,7-tetramethylcyclotetra-siloxane, 1-propyl-3,5,7-trihydrogen-1,3,5, 7-tetra-methylcyclotetrasiloxane, and 1,5-dihydrogen-3,7-dihexyl-1,3,5,7-tetramethylcyclo-tetrasiloxane.

The organohydrogenpolysiloxane is preferably blended in an amount of about 0.05 to 10 parts by weight, more preferably about 0.5 to about 5 parts by weight per 100 parts by weight of organopoly-siloxane (A). Less than 0.05 part of organohydrogepoly-siloxane would be ineffective for its purpose whereas more than 10 parts would detract from physical properties and heat resistance of a cured product.

Component (E) is a platinum catalyst which may be selected from platinum element, platinum compounds and platinum complexes. Examples include chloro-platinic acid (chloroplatinous acid and chloro-platinic acid), and complexes of chloroplatinic acid with alcohols, aldehydes, ethers and olefins.

A catalytic amount of the platinum catalyst is generally used. The platinum catalyst is preferably blended in an amount of about 0.1 to about 1,000 parts, more preferably about 1 to 200 parts by weight calculated as platinum atom per million parts by weight of component (A). Less than 0.1 ppm of the platinum catalyst would fail to improve the fatigue endurance of sponge cell walls to a satisfactory level.

When the composition of the invention is cured, crosslinking reaction by organic peroxide (C) should be predominant and addition reaction by organohydrogenpolysiloxane (D) and platinum catalyst (E) be subordinate. Therefore components (D) and (E) should desirably be used as subordinate components with respect to the crosslinking reaction. This is because if crosslinking through addition reaction becomes predominant, it becomes difficult to control scorching reaction and hence almost impossible to have an acceptable pot life and to produce a satisfactory foam. The addition reaction by components (D) and (E) should preferably be controlled to such an extent that expansion through ordinary addition reaction without the organic peroxide can cause gas escape and thus fails to form satisfactory cells. This is also effective in providing long-term storage stability.

This control can be done by blending components (D) and (E) in the above-mentioned amounts and using a reaction control agent. The reaction control agent used herein is selected from well-known control agents for restraining addition reaction, for example, methylvinylcyclotetrasiloxane, acetylene alcohols, amine compounds, phosphorus compounds, and sulfur compounds. The amount of the control agent added, which depends on the type of control agent, is generally about 10 to 1,000 mol per mol of platinum or about 0.01 to 1 part by weight per 100 parts by weight of the expandable conductive silicone rubber composition.

The blowing agent as component (F) is blended in the composition of the invention such that a molded part obtained from the composition may be an expanded one or foam. Any blowing agent may be used as long as it remains stable at room temperature, but releases a foaming gas upon exposure to high temperature. The foaming gas is preferably nitrogen gas although carbon dioxide and other gases are acceptable. The blowing agent may be selected from commercially available ones. Exemplary blowing agents are those having a decomposition temperature of 80° to 300° C., such as azobisisobutyronitrile, dinitrosopentamethylenetetramine, benzenesulfonhydrazide. N,N'-dinitroso-N,N'-dimethyl-terephthalamide, and azodicarbonamide.

The blowing agent is preferably blended in an amount of about 1 to about 10 parts, more preferably about 3 to about 7 parts by weight per 100 parts by weight of organopolysiloxane (A).

If desired, any of the additives commonly used in conventional silicone rubber compositions may be added to the composition of the present invention. Such additives include dispersants such as low molecular weight siloxanes having a degree of polymerization of up to 100, silanol-containing silane, and alkoxy-containing silanes; heat resistance enhancers such as iron oxide, cerium oxide, and iron octylate; pigments; and reinforcing fillers in the form of silica fine powder such as fumed silica and wet silica which may or may not be surface treated to be hydrophobic, ground quartz, diato-maceous earth. Also useful are saturated aliphatic hydrocarbons such as isoparaffin solvent for imparting processability and moldability to the composition, and other well-known additives used in conventional silicone rubber compositions.

The composition of the invention may be prepared by uniformly mixing predetermined amounts of essential components (A) to (F). Although the order of addition of these components is not critical, it is preferred to prepare the composition by adding to organopolysiloxane (A), conductive carbon black (B), organic peroxide (C), blowing agent (F), organohydro-genpolysiloxane (D), an optional control agent, and platinum catalyst (E) and kneading or milling the mixture in a Banbury mixer or roll mill. If milling entails heat generation or heating is necessary for enabling milling, components (A) and (B) are milled and cooled to approximately room temperature before components (C), (F), (D) and (E) are added.

The expandable conductive silicone rubber composition of the present invention thus prepared may be vulcanized into an elastomer either through press vulcanization at 100° to 200° C. or through atmospheric hot air vulcanization (HAV), although the latter is preferred. In HAV, the composition will expand and cure at a temperature of 200° to 500° C. within about 5 seconds to about 10 minutes. Hot air combined with heating by an infrared heater is also useful. Since the composition has good ultra-high frequency (UHF) absorption due to the inclusion of carbon black, atmospheric hot air vulcanization (HAV) combined with UHF heating is also useful.

In this way, the composition is molded and cured into a conductive silicone rubber foam which is surface tack-free and has tough sponge cell walls and improved fatigue endurance. Therefore, the expandable conductive silicone rubber composition of the invention is advantageously used for the manufacture of electromagnetic shielding members, building gaskets, sponge rolls having a conductivity in a semiconductive region as represented by a resistivity of $10^3$ to $10^{10}$ $\Omega.$cm (such as charging rolls, transfer rolls, developing rolls, paper feed rolls, fixing rolls, and pressure rolls), and sponge sheets such as antistatic mats.

EXAMPLE

Examples of the present invention are given below by way of illustration and not by way of limitation. All parts are by weight and the viscosity is measured at 25° C.

Example 1 & Comparative Examples 1–5

Several expandable conductive silicone rubber compositions were prepared by kneading 100 parts of an organopolysiloxane comprised of 99.7 mol % of dimethylsiloxane units and 0.275 mol % of methylvinyl-siloxane units, blocked with 0.025 mol % of a dimethylvinylsilyl group at either and of its molecular chain, and having a viscosity of $1 \times 10^7$ cs with 40 parts of acetylene black in a pressure kneader to form a base compound. To 100 parts by weight of the base compound were added an organic peroxide, methylhydrogenpolysiloxane blocked with a trimethylsilyl group at either end of its molecular end and containing 1.6 mol/100 g of $\equiv$ SiH bond, a platinum catalyst, and azobisisobutyronitrile as a blowing agent in the amounts shown in Table 1.

Using an extruder having a diameter of 40 mm, the expandable conductive silicone rubber compositions were extruded into tubes having an inner diameter of 3 mm and an outer diameter of 6 mm. The tubes were placed in an atmospheric hot air vulcanizing apparatus having an extrusion temperature of 250° C. and a length of about 3 m where they were subject to atmospheric hot air vulcanization in a residence time of about 5 minutes, yielding conductive silicone rubber foams.

The conductive silicone rubber foams were examined for surface tack, blowing magnification, hardness (Ascar C scale), endurance and cell wall by the following methods.

Surface tack

A conductive silicone rubber foam on the surface was touched with fingers to determine whether or not it was tacky.

Endurance test

A cylindrical aluminum core having a diameter of 6 mm was inserted into a conductive silicone rubber foam to construct a roll of 30 cm long. such two rolls were placed under pressure contact under a load of 1 kgf and rotated at 20 r.p.m. at a temperature of 200° C. for 5 days. The hardness of the roll was measured before and after the endurance test.

Cell wall state

Cell walls were visually observed.

The results are shown in Table 1.

TABLE 1

|  | Example | Comparative Example | | | | |
|---|---|---|---|---|---|---|
|  | 1 | 1 | 2 | 3 | 4 | 5 |
| Base compound | 100 | 100 | 100 | 100 | 100 | 100 |
| Organic peroxide* | 1.5 | 1.5 | — | — | 1.5 | — |
| Organic peroxide** | — | — | — | — | — | 1.5 |
| Methylhydrogenpolysiloxane | 0.5 | — | 0.5 | 0.5 | — | 0.5 |
| Platinum catalyst*** | 0.005 | — | 0.005 | 0.1 | 0.005 | 0.005 |
| Azobisisobutyronitrile | 3 | 3 | 3 | 3 | 3 | 3 |
| Extrusion | Good | Good | Good | Unextrudable after 3 hours | Good | Good |
| Surface tack | No | Some | Some | Sponge could not be molded | Some | Some |
| Blowing magnification | 2.7 | 3.0 | 3.5 |  | 3.0 | 3.2 |
| Hardness (Ascar C) | 25 | 20 | 10 (gas escape) |  | 19 | 9 (gas escape) |
| Endurance (Ascar C) | | | | | | |
| Initial hardness | 30 | 27 | 19 | — | 26 | 17 |
| Hardness after 5 days | 29 | 5 | 2 | — | 6 | 1 |

TABLE 1-continued

| | Example | Comparative Example | | | | |
|---|---|---|---|---|---|---|
| | 1 | 1 | 2 | 3 | 4 | 5 |
| Change | −1 | −22 | −17 | — | −20 | −16 |
| Cell Wall | No change | Broken | Broken | — | Broken | Broken |

*Organic peroxide:

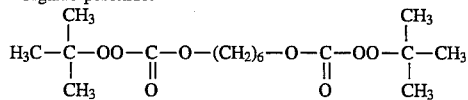

**Organic peroxide:

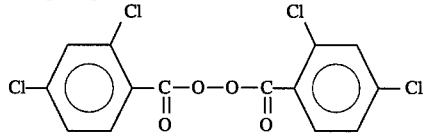

(50% dimethylsilicone oil paste)

***platinum catalyst chloroplatinic acid/2-ethylhexanol solution 1/100 weight ration (Pt 2%)

Examples 2–3 & Comparative Example 6

Several expandable conductive silicone rubber compositions were prepared by kneading 100 parts of an organopolysiloxane comprised of 99.5 mol% of dimethyl-siloxane units and 0.475 mol % of methyl-vinylsiloxane units, blocked with 0.025 mol % of a dimethylvinylsilyl group at either end of its molecular chain, and having a viscosity of $2.1 \times 10^7$ cs with 35 parts of acetylene black in a pressure kneader to form a base compound. To 100 parts by weight of the base compound were added an organic peroxide, methylhydrogenpolysiloxane blocked with a trimethylsilyl group at either end of its molecular end and containing 2.0 mol/100 g of ≡SiH bond, a platinum catalyst, and azobisisobutyronitrile as a blowing agent in the amounts shown in Table 2.

As in Example 1, conductive silicone rubber foams were obtained from the compositions and examined for surface tack, blowing magnification, hardness (Ascar C scale), endurance and cell wall. The results are shown in Table 2.

TABLE 2

| | Example | | Comparative Example |
|---|---|---|---|
| | 2 | 3 | 6 |
| Base compound | 100 | 100 | 100 |
| Organic peroxide | 1.5* | 1.5** | 1.5* |
| Methylhydrogenpoly-siloxane | 0.5 | 0.5 | 0.5 |
| platinum catalyst*** | 0.005 | — | — |
| Azobisisobutyronitrile | 2.5 | 2.5 | 2.5 |
| Extrusion | Good | Good | Good |
| Surface tack | No | No | No |
| Blowing magnification | 2.3 | 2.4 | 2.2 |
| Hardness (Ascar C) | 28 | 29 | 30 |
| Endurance (Ascar C) | | | |
| Initial hardness | 31 | 32 | 34 |
| Hardness after 5 days | 27 | 29 | 7 |
| Change | −4 | −3 | −27 |
| Cell wall | No change | No change | Broken |

*Organic peroxide:

$$H_3C-\underset{\underset{CH_3}{|}}{\overset{\overset{CH_3}{|}}{C}}-OO-\underset{\underset{O}{\|}}{C}-O-CH_2-\underset{\underset{CH_3}{|}}{\overset{\overset{CH_3}{|}}{C}}-CH_2-O-\underset{\underset{O}{\|}}{C}-OO-\underset{\underset{CH_3}{|}}{\overset{\overset{CH_3}{|}}{C}}-CH_3$$

**Organic peroxide:

$$H_3C-\underset{\underset{CH_3}{|}}{\overset{\overset{CH_3}{|}}{C}}-OO-\underset{\underset{O}{\|}}{C}-O-(C_2H_4O)-C_2H_4-O-\underset{\underset{O}{\|}}{C}-OO-\underset{\underset{CH_3}{|}}{\overset{\overset{CH_3}{|}}{C}}-CH_3$$

***platinum catalyst chloroplatinic acid/benzotriazole solution 1/100 weight ratio (Pt 2%)

There has been described an expandable conductive silicone rubber composition loaded with conductive carbon black which is fully stable during shelf storage, has a long pot life, and despite carbon black loaded, is rapidly expandable and curable through hot air vulcanization into a conductive silicone rubber foam having high conductivity and improved physical properties, especially improved fatigue endurance of sponge cells when the foam is used as a sponge roll.

Japanese Patent Application No. 112245/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. An expandable conductive silicone rubber composition comprising (A) an organopolysiloxane of the following general formula (1):

$$R^1_a SiO_{(4-a)/2} \tag{1}$$

wherein $R^1$, which may be identical or different, is a substituted or unsubstituted monovalent hydrocarbon group, at least two alkenyl groups being contained per molecule, and letter a is a positive number of 1.90 to 2.05.

(B) conductive carbon black, (C) an organic peroxide of the following general formula (2):

$$R^2-OO-\underset{\underset{O}{\|}}{C}-O-X-O-\underset{\underset{O}{\|}}{C}-OO-R^3 \quad (2)$$

wherein each of $R^2$ and $R^3$ which may be identical or different is a monovalent hydrocarbon group having 3 to 10 carbon atoms or a group of the following formula (3):

$$-SiR^4_3 \quad (3)$$

wherein $R^4$ is a methyl, ethyl or phenyl group,

X is a group of the following formula (4), (5) or (6):

$$\mathrm{+CH_2\mathrm{+}_n} \quad (4)$$

$$-CH_2-\underset{\underset{CH_3}{|}}{\overset{\overset{CH_3}{|}}{C}}-CH_2- \quad (5)$$

$$\mathrm{+C_2H_4O\mathrm{+}_m C_2H_4-} \quad (6)$$

wherein n is an integer of 2 to 8 and m is an integer of 1 to 4, (D) an organohydrogenpolysiloxane, (E) a platinum catalyst, and (F) a blowing agent.

2. The composition of claim 1 comprising, in parts by weight, 100 parts of component (A), about 5 to about 100 parts of component (B), about 0.1 to about 5 parts of component (C), about 0.05 to about 10 parts of component (D), a catalytic amount of component (E), and about 1 to about 10 parts of component (F).

3. A conductive sponge roll obtained by expanding and curing the expandable conductive silicone rubber composition of claim 1.

4. The composition of claim 1, wherein in formula (1), $R^1$ is a monovalent hydrocarbon group of 1 to 12 carbon atoms, optionally substituted by halogen atoms or cyano groups.

5. The composition of claim 1, wherein in component (A), the amount of alkenyl groups is 0.01 to 10 mol %.

6. The composition of claim 1, wherein the conductive carbon black, (B), is acetylene black, conducting furnace black, super conducting furnace black, extra conducting furnace black, conducting channel black, furnace black heated at a temperature of about 1500° C. or channel black heated at a temperature of about 1500° C.

7. The composition of claim 1, wherein the organohydrogenpolysiloxane is of the following average compositional formula:

$$R_n H_m SiO_{(4-m-n)/2}$$

wherein R is a substituted or unsubstituted monovalent hydrocarbon group of 1 to 12 carbon atoms and letter m and n satisfy the equations; $0 \leq n < 4$, $0 < m < 3$ and $0 < m+n < 4$.

8. The composition of claim 1, wherein the platinum catalyst, (E), is used in an amount of 0.1 to 1000 parts by weight calculated as platinum atoms per million parts by weight of component (A).

9. The composition of claim 1, which additionally comprises a reaction control agent selected from the group consisting of methylvinylcyclotetrasiloxane, an acetylene alcohol, an amine compound, a phosphorus compound and a sulfur compound.

10. The composition of claim 1, wherein the blowing agent, (F), is azobisisobutyronitrile, dinitrosopentamethylenetetramine, benzenesulfonhydrazide, N, N'-dinitroso-N, N'-dimethyl-terephthalamide, or azodicarbonamide.

11. A conductive sponge roll of claim 3, having a resistivity of $10^3$ to $10^{10}$ Ω.cm.

* * * * *